(12) United States Patent
Ju et al.

(10) Patent No.: US 11,196,120 B2
(45) Date of Patent: Dec. 7, 2021

(54) BATTERY MODULE, AND BATTERY PACK AND VEHICLE COMPRISING SAME

(71) Applicant: LG Chem, Ltd., Seoul (KR)

(72) Inventors: Eun-Ah Ju, Daejeon (KR); Sung-Won Seo, Daejeon (KR); Yoon-Koo Lee, Daejeon (KR); Hee-Jun Jin, Daejeon (KR); Jeong-O Mun, Daejeon (KR); Alexander Eichhorn, Bietigheim-Bissingen (DE); Andreas Track, Bietigheim-Bissingen (DE); Valentin Brokop, Bietigheim-Bissingen (DE)

(73) Assignee: LG Chem, Ltd.

( * ) Notice: Subject to any disclaimer, the term of this patent is extended or adjusted under 35 U.S.C. 154(b) by 97 days.

(21) Appl. No.: 16/625,414

(22) PCT Filed: Nov. 28, 2018

(86) PCT No.: PCT/KR2018/014870
§ 371 (c)(1),
(2) Date: Dec. 20, 2019

(87) PCT Pub. No.: WO2019/124796
PCT Pub. Date: Jun. 27, 2019

(65) Prior Publication Data
US 2020/0411814 A1 Dec. 31, 2020

(30) Foreign Application Priority Data
Dec. 20, 2017 (KR) .......................... 10-2017-0176339

(51) Int. Cl.
*H01M 50/20* (2021.01)
*H01M 50/242* (2021.01)
(Continued)

(52) U.S. Cl.
CPC ......... *H01M 50/20* (2021.01); *H01M 50/202* (2021.01); *H01M 50/209* (2021.01);
(Continued)

(58) Field of Classification Search
None
See application file for complete search history.

(56) References Cited

U.S. PATENT DOCUMENTS

| 2011/0151311 A1 | 6/2011 | Lee et al. |
| 2012/0028099 A1* | 2/2012 | Aoki ................. H01M 10/6557 429/120 |

(Continued)

FOREIGN PATENT DOCUMENTS

| CN | 106654101 A | 5/2017 |
| EP | 2571078 A2 | 3/2013 |

(Continued)

OTHER PUBLICATIONS

Extended European Search Report including Written Opinion for Application No. EP18890647.3, dated Oct. 5, 2020, pp. 1-9.

(Continued)

*Primary Examiner* — Gregg Cantelmo
(74) *Attorney, Agent, or Firm* — Lerner, David, Littenberg, Krumholz & Mentlik, LLP (57) ABSTRACT

A battery module includes: a first battery cell assembly having at least one battery cell; a second battery cell assembly spaced apart from the first battery cell assembly by a predetermined distance and having at least one battery cell; a bottom plate configured to integrally support the second battery cell assembly and the first battery cell assembly; and a top plate disposed above the bottom plate to integrally cover the first battery cell assembly and the second battery cell assembly.

8 Claims, 7 Drawing Sheets

(51) Int. Cl.
    *H01M 50/202*     (2021.01)
    *H01M 50/249*     (2021.01)
    *H01M 50/271*     (2021.01)
    *H01M 50/236*     (2021.01)
    *H01M 50/209*     (2021.01)
    *B60L 50/64*     (2019.01)

(52) U.S. Cl.
    CPC ....... *H01M 50/236* (2021.01); *H01M 50/242* (2021.01); *H01M 50/249* (2021.01); *H01M 50/271* (2021.01); *B60L 50/64* (2019.02); *H01M 2220/20* (2013.01)

(56) References Cited

U.S. PATENT DOCUMENTS

| | | | |
|---|---|---|---|
| 2012/0098543 A1 | 4/2012 | Rutkowski et al. | |
| 2012/0270074 A1 | 10/2012 | Koh | |
| 2013/0030587 A1* | 1/2013 | El-Barbari | H02J 3/381 |
| | | | 700/292 |
| 2013/0052516 A1 | 2/2013 | Kim | |
| 2013/0059180 A1* | 3/2013 | Yang | H01M 10/6557 |
| | | | 429/72 |
| 2013/0071713 A1 | 3/2013 | Kim | |
| 2013/0309560 A1 | 11/2013 | Lent et al. | |
| 2013/0330579 A1* | 12/2013 | Ejiri | H01M 50/572 |
| | | | 429/53 |
| 2014/0220391 A1* | 8/2014 | Fujii | H01M 10/6554 |
| | | | 429/7 |
| 2014/0284125 A1* | 9/2014 | Katayama | B60L 50/64 |
| | | | 180/68.5 |
| 2016/0133890 A1 | 5/2016 | Lee et al. | |
| 2016/0197332 A1 | 7/2016 | Lee et al. | |
| 2016/0218388 A1 | 7/2016 | Kim et al. | |
| 2016/0372805 A1 | 12/2016 | Kim et al. | |
| 2017/0012330 A1 | 1/2017 | Kim et al. | |
| 2017/0187084 A1 | 6/2017 | Park et al. | |
| 2017/0214013 A1* | 7/2017 | Benedict | H01M 50/20 |
| 2018/0309101 A1 | 10/2018 | Nakai et al. | |
| 2020/0144571 A1 | 5/2020 | Yang et al. | |

FOREIGN PATENT DOCUMENTS

| | | |
|---|---|---|
| EP | 3345779 A1 | 7/2018 |
| JP | 2002352786 A | 12/2002 |
| JP | 2013045765 A | 3/2013 |
| JP | 2013065558 A | 4/2013 |
| JP | 2015106531 A | 6/2015 |
| JP | 2016523431 A | 8/2016 |
| JP | 2017004926 A | 1/2017 |
| KR | 20040000950 A | 1/2004 |
| KR | 20110073221 A | 6/2011 |
| KR | 20120005727 A | 1/2012 |
| KR | 20120047897 A | 5/2012 |
| KR | 20130129833 A | 11/2013 |
| KR | 20150016417 A | 2/2015 |
| KR | 20150022459 A | 3/2015 |
| KR | 20150099965 A | 9/2015 |
| KR | 20150100365 A | 9/2015 |
| KR | 20160005894 A | 1/2016 |
| KR | 20160050492 A | 5/2016 |
| WO | 2016185961 A1 | 11/2016 |
| WO | 2017068708 A1 | 4/2017 |
| WO | 2019017131 A1 | 1/2019 |

OTHER PUBLICATIONS

International Search Report for Application No. PCT/KR2018/014870 dated Apr. 1, 2019, 3 pages.

* cited by examiner

BATTERY MODULE, AND BATTERY PACK AND VEHICLE COMPRISING SAME

CROSS-REFERENCE TO RELATED APPLICATIONS

The present application is a national phase entry under 35 U.S.C. § 371 of International Application No. PCT/KR2018/014870, filed Nov. 28, 2018, which claims priority to Korean Patent Application No. 10-2017-0176339 filed on Dec. 20, 2017 in the Republic of Korea, the disclosures of which are incorporated herein by reference.

TECHNICAL FIELD

The present disclosure relates to a battery module, and a battery pack and a vehicle including the battery module.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at the present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5 V to 4.6 V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module composed of at least one battery cell first, and then configure a battery pack by using at least one battery module and adding other components. Here, the battery cells configuring the battery module or the battery pack are generally pouch-type secondary batteries that may be easily stacked on one another.

A conventional battery pack includes a plurality of battery modules and a pack tray on which the plurality of battery modules are placed. Here, each battery module is configured to include a single battery cell assembly that includes at least one battery cell.

Here, if the required capacity increases, the number of battery cell assemblies also increases. If the number of battery cell assemblies increases, the number of battery modules also increases. Depending on the increasing number of battery cell assemblies, the assembling time for the battery module or the battery pack also increases, and the assembling structure becomes complicated. Thus, when a large capacity is required, it is required to find a solution to reduce an assembling time with a simple structure in aspect of the assembling process efficiency.

Moreover, there is also a need for securing the structural rigidity and increasing the energy density when a large-capacity battery pack is configured.

DISCLOSURE

Technical Problem

Therefore, the present disclosure is directed to providing a battery module, and a battery pack and a vehicle including the battery module, which may have an improved energy density.

In addition, the present disclosure is directed to providing a battery module, and a battery pack and a vehicle including the battery module, which may improve the assembling process.

Moreover, the present disclosure is directed to providing a battery module, and a battery pack and a vehicle including the battery module, which may reinforce the rigidity with a simpler structure.

Technical Solution

In one aspect of the present disclosure, there is provided a battery module, comprising: a first battery cell assembly having at least one battery cell; a second battery cell assembly spaced apart from the first battery cell assembly by a predetermined distance and having at least one battery cell; a bottom plate configured to integrally support the second battery cell assembly and the first battery cell assembly; and a top plate disposed above the bottom plate to integrally cover the first battery cell assembly and the second battery cell assembly.

The battery module may further comprise a connection bridge disposed between the first battery cell assembly and the second battery cell assembly and fastened to the first battery cell assembly and the second battery cell assembly.

The battery module may further comprise a first edge bridge connected to one end of the first battery cell assembly and disposed at a side of the first battery cell assembly that is opposite to the connection bridge, and a second edge bridge connected to one end of the second battery cell assembly and disposed at a side of the second battery cell assembly that is opposite to the connection bridge.

Each of the first battery cell assembly and the second battery cell assembly may include opposing side plates disposed between the top plate and the bottom plate and fastened to the connection bridge and the respective one of the first and second edge bridges.

In another aspect of the present disclosure, there is also provided a battery pack, comprising: at least one battery module according to the above embodiments; and a pack tray on which the at least one battery module is placed.

Each battery module of the at least one battery module may include a connection bridge disposed between the first battery cell assembly and the second battery cell assembly and fastened to the first battery cell assembly and the second battery cell assembly.

Each battery module of the at least one battery module may include a first edge bridge connected to one end of the first battery cell assembly and disposed at a side of the first battery cell assembly that is opposite to the connection bridge, and a second edge bridge connected to one end of the second battery cell assembly and disposed at a side of the second battery cell assembly that is opposite to the connection bridge.

The at least one battery module may include a plurality of battery modules, and the plurality of battery modules may be placed along a lateral direction of the pack tray.

The battery pack may further comprise connection bridge fixing units configured to fix two facing connection bridges of the plurality of battery modules to each other and to fix the pack tray and the connection bridges to each other.

The connection bridge fixing units may include: first connection bridge fixing units configured to fix two facing connection bridges of the plurality of battery modules to each other; and second connection bridge fixing units configured to connect the pack tray and the connection bridge of the battery module disposed at one end of the pack tray to each other and to connect the pack tray and the connection bridge of the battery module disposed at the other end of the pack tray to each other, respectively.

The battery pack may further comprise edge bridge fixing units configured to connect the pack tray and the edge bridges of the plurality of battery modules to each other.

The edge bridge fixing units may include: a first edge bridge fixing unit configured to connect the pack tray and the first edge bridges to each other; and a second edge bridge fixing unit configured to connect the pack tray and the second edge bridges to each other.

In another aspect of the present disclosure, there is also provided a vehicle, comprising at least one battery pack according to the above embodiments.

Advantageous Effects

According to various embodiments as above, it is possible to provide a battery module, and a battery pack and a vehicle including the battery module, which may have an improved energy density.

In addition, according to various embodiments of the present disclosure, it is possible to provide a battery module, and a battery pack and a vehicle including the battery module, which may improve the assembling process.

Moreover, according to various embodiments of the present disclosure, it is possible to provide a battery module, and a battery pack and a vehicle including the battery module, which may reinforce the rigidity with a simpler structure.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
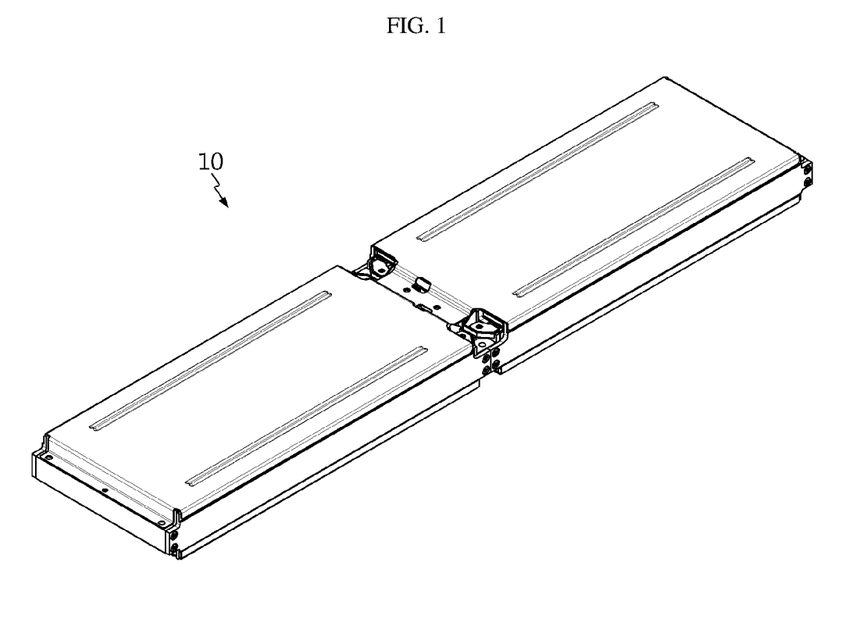
FIG. 1 is a diagram for illustrating a battery module according to an embodiment of the present disclosure.
Figure 2:
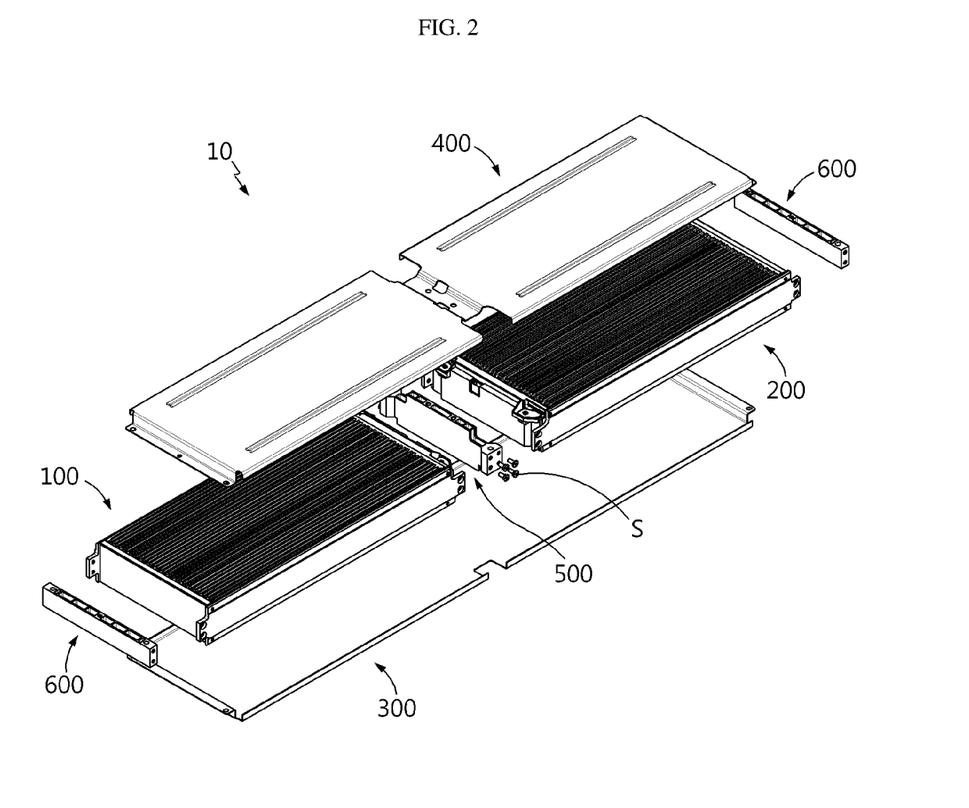
FIG. 2 is an exploded perspective view showing the battery module of FIG. 1.
Figure 3:
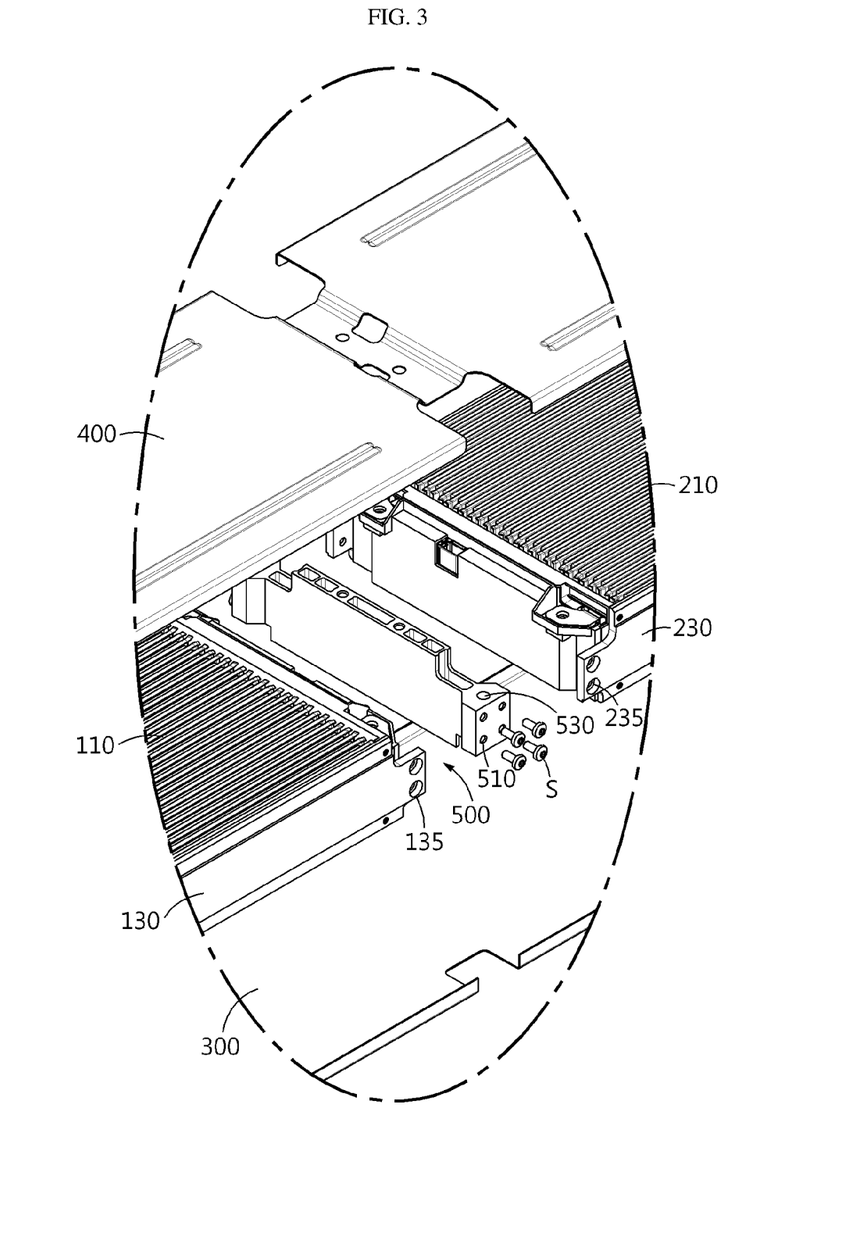
FIG. 3 is a diagram for illustrating a main part of the battery module of FIG. 2.

FIG. 1 is a diagram for illustrating a battery module according to an embodiment of the present disclosure, FIG. 2 is an exploded perspective view showing the battery module of FIG. 1, and FIG. 3 is a diagram for illustrating a main part of the battery module of FIG. 2.

Referring to FIGS. 1 to 3, a battery module 10 may be mounted as an energy source of a vehicle such as an electric vehicle or a hybrid electric vehicle, and may include a first battery cell assembly 100, a second battery cell assembly 200, a bottom plate 300, a top plate 400, a connection bridge 500 and an edge bridge 600.

The first battery cell assembly 100 may include a battery cell 110 and a side plate 130.

At least one battery cell 110 may be provided, and the battery cell 110 may also be provided in plural. In the following description, it is assumed that a plurality of battery cells 110 is provided. The battery cell 110 may be a secondary battery, for example a pouch-type secondary battery.

Side plates 130 may cover both left and right sides, respectively, of the plurality of battery cells 110. The side plate 130 may be disposed between the top plate 400 and the bottom plate 300, explained later.

The side plate 130 may be fastened to the connection bridge 500 and the edge bridge 600, explained later, by using a screw member S or the like. To this end, the side plate 130 may have a plurality of bridge fastening holes 135.

The plurality of bridge fastening holes 135 may be provided at both front and rear ends of the side plate 130, respectively. The plurality of bridge fastening holes 135 provided at one of both front and rear ends of the side plate 130 may be screwed to the connection bridge 500, explained later, and the plurality of bridge fastening holes 135 provided at the other side may be screwed to the edge bridge 600.

The side plate 130 connected to the connection bridge 500 and the edge bridge 600 through the plurality of bridge fastening holes 135 may function as a crush beam that absorbs an impact when an external impact is applied to the battery module 10 or a battery pack 1, explained later.

The second battery cell assembly 200 may be disposed at the rear of the first battery cell assembly 100 to be spaced apart from the first battery cell assembly 100 by a predetermined distance. The second battery cell assembly 200 may include a battery cell 210 and a side plate 230.

At least one battery cell 210 may be provided, and the battery cell 210 may be provided in plural. Hereinafter, in this embodiment, it is assumed that a plurality of battery cells 210 is provided. The battery cell 210 may be a secondary battery, for example a pouch-type secondary battery.

Side plates 230 may cover both left and right sides, respectively, of the plurality of battery cells 210. The side plate 230 may be disposed between the top plate 400 and the bottom plate 300, explained later.

The side plate 230 may be fastened to the connection bridge 500 and the edge bridge 600, explained later, by using a screw member S or the like. To this end, the side plate 230 may have a plurality of bridge fastening holes 235.

The plurality of bridge fastening holes 235 may be provided at both front and rear ends of the side plate 230, respectively. The plurality of bridge fastening holes 235 provided at one of both front and rear ends of the side plate 230 may be screwed to the connection bridge 500, explained later, and the plurality of bridge fastening holes 235 provided at the other side may be screwed to the edge bridge 600.

The side plate 230 connected to the connection bridge 500 and the edge bridge 600 through the plurality of bridge fastening holes 235 may function as a crush beam that absorbs an impact when an external impact is applied to the battery module 10 or the battery pack 1, explained later.

The bottom plate 300 is disposed at a lower side of the first battery cell assembly 100 and the second battery cell assembly 200 and may integrally support the first battery cell assembly 100 and the second battery cell assembly 200.

The top plate 400 is provided above the bottom plate 300 and disposed at an upper side of the first battery cell assembly 100 and the second battery cell assembly 200, and may integrally cover the first battery cell assembly 100 and the second battery cell assembly 200.

The connection bridge 500 is disposed between the first battery cell assembly 100 and the second battery cell assembly 200 and may be fastened to the first battery cell assembly 100 and the second battery cell assembly 200 by using the screw member S.

The connection bridge 500 may function as a crush beam between the first battery cell assembly 100 and the second battery cell assembly 200 to absorb an impact when an external impact is applied to the battery module 10 or the battery pack 1, explained later.

The connection bridge 500 may have an assembly connection hole 510 and a module fixing hole 530.

The assembly connection holes 510 are provided at both left and right ends of the connection bridge 500, and the screw members S fastened to the first battery cell assembly 100 and the screw members S fastened to the second battery cell assembly 200 may be fastened to the assembly connection holes 510.

The module fixing hole 530 is provided along a height direction of the connection bridge 500, and a connection bridge fixing unit 50, explained later, may be fastened to the module fixing hole 530.

Edge bridges 600 may be connected to one end of the first battery cell assembly 100 and one end of the second battery cell assembly 200, respectively, and may be disposed at sides of the battery cell assemblies 100, 200 opposite to the connection bridge 500.

Specifically, edge bridges 600 may be connected to the side plate 130 of the first battery cell assembly 100 and to the side plate 230 of the second battery cell assembly 200, respectively.

The edge bridge 600 may function as a crush beam at one of the first battery cell assembly 100 and the second battery cell assembly 200 to absorb an impact when an external impact is applied to the battery module 10 or the battery pack 1, explained later.

The edge bridge 600 may include an assembly connection hole and a module fixing hole 630.

The assembly connection holes are provided at both left and right ends of the edge bridge 600, and the screw members S fastened to the first battery cell assembly 100 or the screw members S fastened to the second battery cell assembly 200 may be fastened to the assembly connection holes.

The module fixing hole 630 is provided along a height direction of the edge bridge 600, and an edge bridge fixing unit 70, explained later, may be fastened to the module fixing hole 630.

As described above, in the battery module 10 of this embodiment, the plurality of battery cell assemblies 100, 200 may be provided as a single module by using the bottom plate 300 and the top plate 400 that integrally cover the two battery cell assemblies 100, 200, without forming each battery cell assembly as a separate module.

Accordingly, since the battery module 10 of this embodiment may package the plurality of battery cell assemblies as a single battery module, even though the number of battery cell assemblies increases according to the required energy capacity, the number of manufactured battery modules 10 may be reduced.

Thus, in this embodiment, the manufacturing time for the battery module 10 may also be reduced together, and the structure of the battery module 10 may be simplified using the bottom plate 300 and the top plate 400 that integrally cover the battery cell assemblies 100, 200, thereby simplifying the assembling structure.

By doing so, in this embodiment, it is possible to provide the battery module 10, which has a simple structure in terms of the assembling process efficiency and is capable of reducing the assembling time when a large-capacity battery module is manufactured.

Figure 4:
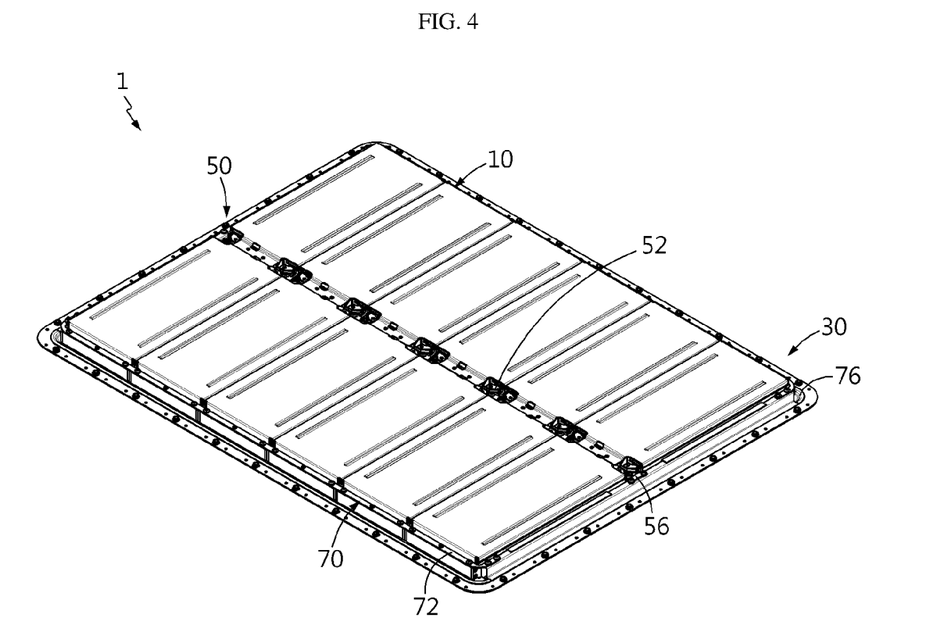
FIG. 4 is a diagram for illustrating a battery pack according to an embodiment of the present disclosure.
Figure 5:
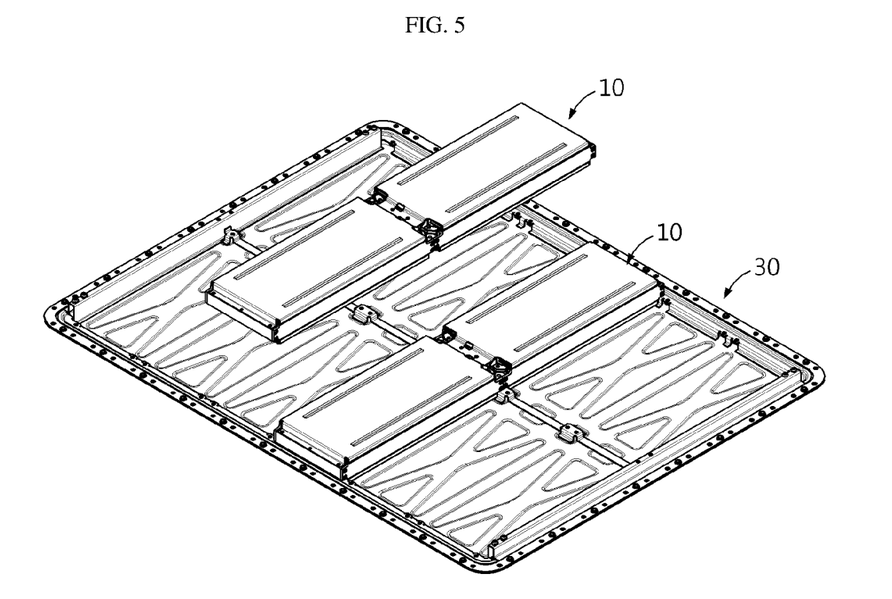
FIGS. 5 to 8 are diagrams for illustrating an assembling process for the battery pack depicted in FIG. 4.
Figure 6:
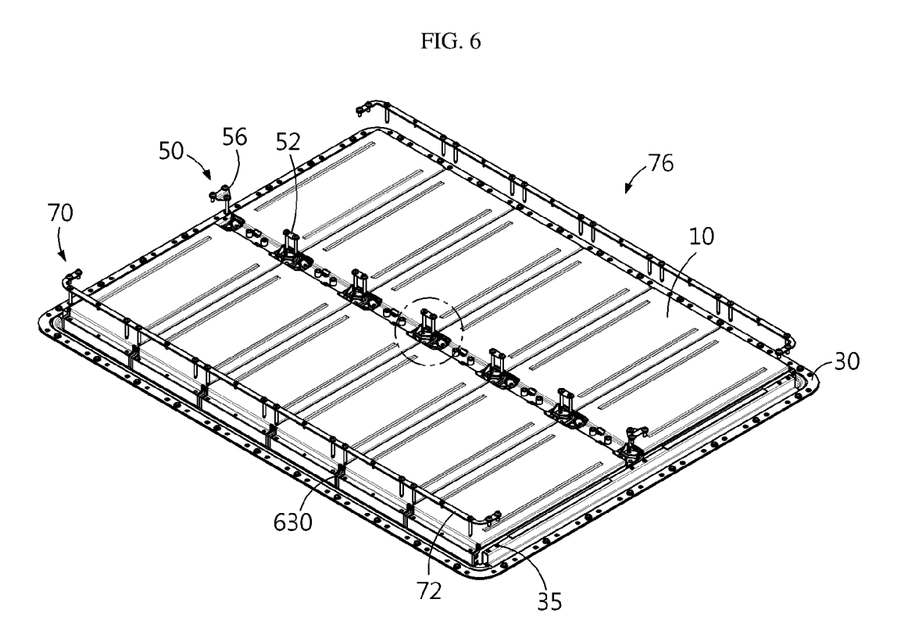

FIG. 4 is a diagram for illustrating a battery pack according to an embodiment of the present disclosure.

Referring to FIG. 4, the battery pack 1 may include the battery module 10, a pack tray 30, connection bridge fixing units 50, and edge bridge fixing units 70.

The battery module 10 may be provided in plural. The plurality of battery modules 10 may be placed in the pack tray 30, explained later, along a lateral direction of the pack tray 30, explained later.

The pack tray 30 is mounted in a vehicle such as a car and may allow the plurality of battery modules 10 to be placed therein. To this end, the pack tray 30 may have an accommodation space for accommodating the plurality of battery modules 10 therein.

The pack tray 30 may have a fixing unit fastening hole 35.

The fixing unit fastening hole 35 may be provided in plural. The plurality of fastening holes 35 may be provided along a rim of the pack tray 30. The plurality of fixing unit fastening holes 35 may be fastened to the connection bridge fixing units 50 and edge bridge fixing units 70, explained later.

Figure 7:
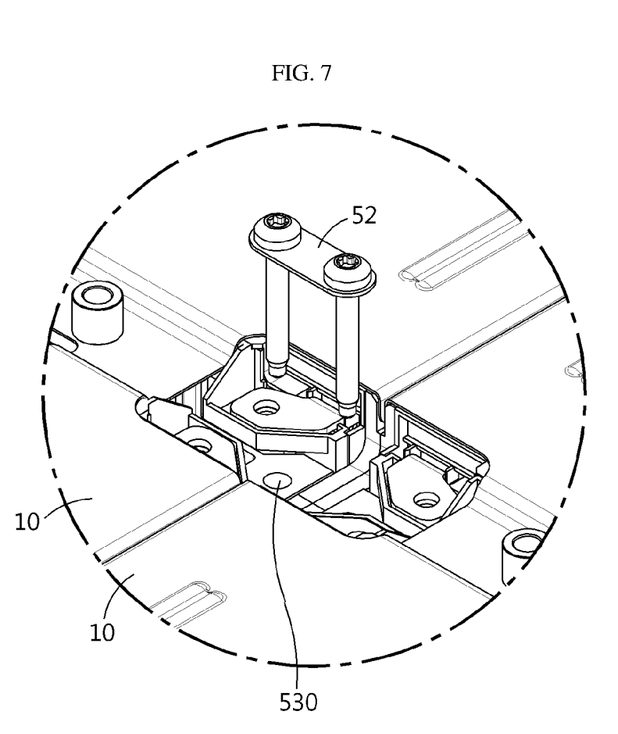
Figure 8:
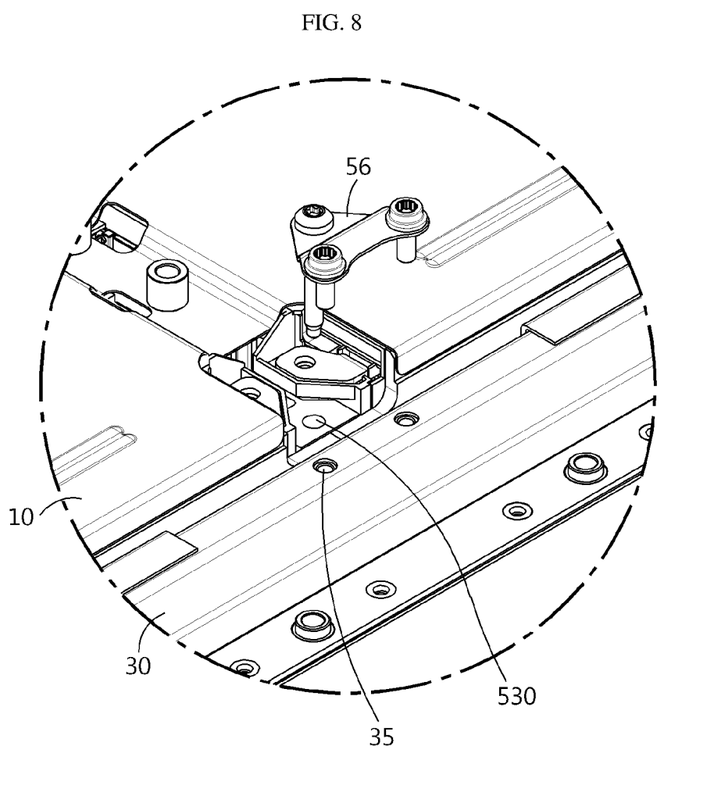

The connection bridge fixing units 50 may fix two facing connection bridges 500 (see FIGS. 3 and 7) of the plurality of battery modules 10 to each other and fix the pack tray 30 and the connection bridge 500 (see FIGS. 3 and 8) to each other.

The connection bridge fixing units 50 may include a first connection bridge fixing unit 52 and a second connection bridge fixing unit 56.

The first connection bridge fixing unit 52 may fix two facing connection bridges 500 (see FIGS. 3 and 7) of the plurality of battery modules 10 to each other.

Second connection bridge fixing units 56 may connect the pack tray 30 and the connection bridge 500 (see FIGS. 3 and 8) of the battery module 10 disposed at one end of the pack tray 30 to each other and connect the pack tray 30 and the connection bridge 500 (see FIGS. 3 and 8) of the battery module 10 disposed at the other end of the pack tray 30 to each other, respectively.

The edge bridge fixing units 70 may connect the edge bridges 600 (see FIG. 2) of the plurality of battery modules 10 and the pack tray 30 to each other.

The edge bridge fixing units 70 may include a first edge bridge fixing unit 72 and a second edge bridge fixing unit 76.

The first edge bridge fixing unit 72 may connect the pack tray 30 and the edge bridges 600 (see FIG. 2) connected to one end of the first battery cell assembly 100 of the plurality of battery modules 10 to each other.

The second edge bridge fixing unit 76 may connect the pack tray 30 and the edge bridges 600 (see FIG. 2) connected to one end of the second battery cell assembly 200 of the plurality of battery modules 10 to each other.

Hereinafter, the assembling process for the battery pack 1 will be described in more detail.

FIGS. 5 to 8 are diagrams for illustrating an assembling process for the battery pack depicted in FIG. 4.

Referring to FIGS. 5 to 8, the plurality of battery modules 10 may be placed inside the pack tray 30 during the assembling process for the battery pack 1. At this time, the plurality of battery modules 10 may be arranged along the lateral direction of the pack tray 30.

All of the plurality of battery modules 10 are placed in the pack tray 30, and the connection bridge fixing units 50 and the edge bridge fixing units 70 may connect the plurality of battery modules 10 to each other and connect the plurality of battery modules 10 and the pack tray 30 to each other so that the plurality of battery modules 10 are fixed inside the pack tray 30.

Specifically, the first connection bridge fixing units 52 of the connection bridge fixing units 50 may be fastened to the module fixing holes 530 of the connection bridges 500 of facing battery modules 10 among the plurality of battery modules 10 to fix the facing battery modules 10.

The second connection bridge fixing units 56 of the connection bridge fixing units 50 may be fastened to the fixing unit fastening holes 35 of the pack tray 30 and the module fixing holes 530 of the connection bridges 500 of the battery modules 10 disposed adjacent to the pack tray 30 to fix the battery modules 10 to the pack tray 30.

Here, the connection bridges 500 (see FIGS. 3, and 4) of the plurality of battery modules 10 connected to each other through the connection bridge fixing units 50 are interconnected integrally, thereby enhancing the structural rigidity of the battery pack 1 in the lateral direction and functioning as a crush beam that is capable of absorbing an impact when an external impact is applied thereto.

In addition, the first edge bridge fixing unit 72 of the edge bridge fixing units 70 may be fastened to the fixing unit fastening holes 35 of the pack tray 30 and the edge bridges 600 (see FIG. 2) connected to one end of the first battery cell assembly 100 of the plurality of battery modules 10 at a part of the front side and both sides of the battery pack 10 to fix the battery modules 10 to the pack tray 30.

The second edge bridge fixing unit 76 of the edge bridge fixing units 70 may be fastened to the fixing unit fastening holes 35 of the pack tray 30 and the edge bridges 600 (see FIG. 2) connected to one end of the second battery cell assembly 200 of the plurality of battery modules 10 at a part of the rear side and both sides of the battery pack 10 to fix the battery modules 10 to the pack tray 30.

Here, the edge bridges 600 (see FIGS. 2 and 4) of the plurality of battery modules 10 connected to each other through the edge bridge fixing units 70 are interconnected integrally, thereby enhancing the structural rigidity of the battery pack 1 in the lateral direction and functioning as a crush beam that is capable of absorbing an impact when an external impact is applied thereto.

Meanwhile, the side plates 130, 230 (see FIGS. 3 and 4) of the plurality of battery modules 10 may be integrally connected to each other to enhance the structural rigidity of the battery pack 1 in the front and rear direction and function as a crush beam that is capable of absorbing an impact when an external impact is applied thereto.

According to various embodiments as above, it is possible to provide a battery module 10, and a battery pack 1 and a vehicle including the battery module, which may have an improved energy density.

In addition, according to various embodiments of the present disclosure, it is possible to provide a battery module 10, and a battery pack 1 and a vehicle including the battery module, which may improve the assembling process.

Moreover, according to various embodiments of the present disclosure, it is possible to provide a battery module 10, and a battery pack 1 and a vehicle including the battery module, which may reinforce the rigidity with a simpler structure.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery pack, comprising:
   a plurality of battery modules, each battery module of the plurality of battery modules including:
      a first battery cell assembly having at least one battery cell;
      a second battery cell assembly spaced apart from the first battery cell assembly by a predetermined distance and having at least one battery cell;
      a bottom plate configured to integrally support the second battery cell assembly and the first battery cell assembly; and
      a top plate disposed above the bottom plate to integrally cover the first battery cell assembly and the second battery cell assembly; and
   a pack tray on which the plurality of battery modules are placed, wherein the plurality of battery modules are placed along a lateral direction of the pack tray;
   wherein each battery module of the plurality of battery modules includes a connection bridge disposed between the first battery cell assembly and the second battery cell assembly and fastened to the first battery cell assembly and the second battery cell assembly;
   wherein each battery module of the plurality of battery modules includes a first edge bridge connected to one end of the first battery cell assembly and disposed at a side of the first battery cell assembly that is opposite to the connection bridge, and a second edge bridge connected to one end of the second battery cell assembly and disposed at a side of the second battery cell assembly that is opposite to the connection bridge; and
   wherein the battery pack further comprises connection bridge fixing units configured to fix two facing connection bridges of the plurality of battery modules to each other and to fix the pack tray and the connection bridges to each other.

2. The battery pack according to claim 1,
   wherein the connection bridge fixing units include:

first connection bridge fixing units configured to fix two facing connection bridges of the plurality of battery modules to each other; and second connection bridge fixing units configured to connect the pack tray and the connection bridge of the battery module disposed at one end of the pack tray to each other and to connect the pack tray and the connection bridge of the battery module disposed at the other end of the pack tray to each other, respectively.

3. A vehicle, comprising at least one battery pack according to claim 1.

4. The battery pack according to claim 1,
wherein, in each battery module of the plurality of battery modules, each of the first battery cell assembly and the second battery cell assembly includes opposing side plates disposed between the top plate and the bottom plate and fastened to the connection bridge and the respective one of the first and second edge bridges.

5. A battery pack, comprising:
a plurality of battery modules, each battery module of the plurality of battery modules including:
  a first battery cell assembly having at least one battery cell;
  a second battery cell assembly spaced apart from the first battery cell assembly by a predetermined distance and having at least one battery cell;
  a bottom plate configured to integrally support the second battery cell assembly and the first battery cell assembly; and
  a top plate disposed above the bottom plate to integrally cover the first battery cell assembly and the second battery cell assembly; and
a pack tray on which the plurality of battery modules are placed, wherein the plurality of battery modules are placed along a lateral direction of the pack tray;

wherein each battery module of the plurality of battery modules includes a connection bridge disposed between the first battery cell assembly and the second battery cell assembly and fastened to the first battery cell assembly and the second battery cell assembly;

wherein each battery module of the plurality of battery modules includes a first edge bridge connected to one end of the first battery cell assembly and disposed at a side of the first battery cell assembly that is opposite to the connection bridge, and a second edge bridge connected to one end of the second battery cell assembly and disposed at a side of the second battery cell assembly that is opposite to the connection bridge; and wherein the battery pack further comprises edge bridge fixing units configured to connect the pack tray and the edge bridges of the plurality of battery modules to each other.

6. The battery pack according to claim 5,
wherein the edge bridge fixing units include:
a first edge bridge fixing unit configured to connect the pack tray and the first edge bridges to each other; and
a second edge bridge fixing unit configured to connect the pack tray and the second edge bridges to each other.

7. A vehicle, comprising at least one battery pack according to claim 5.

8. The battery pack according to claim 5,
wherein, in each battery module of the plurality of battery modules, each of the first battery cell assembly and the second battery cell assembly includes opposing side plates disposed between the top plate and the bottom plate and fastened to the connection bridge and the respective one of the first and second edge bridges.

* * * * *